United States Patent Office

3,333,025
Patented July 25, 1967

3,333,025
POLYCHLOROPRENE ADHESIVES
Erich Bader, Hanau am Main, Germany, assignor to Deutsche Gold- und Silber-Scheideanstalt vormals Roessler, Frankfurt am Main, Germany
No Drawing. Continuation of application Ser. No. 139,888, Sept. 22, 1961. This application July 28, 1966, Ser. No. 568,674
Claims priority, application Germany, Sept. 23, 1960, D 34,334
10 Claims. (Cl. 260—880)

This application is a continuation of copending application Ser. No. 139,888, now abandoned.

The present invention relates to improved curable or polymerizable mixtures for the production of adhesives, putties, troweling masses, filling masses, casting masses, coating compositions and the like.

Adhesives, putties and the like which are especially suited for cementing or adhering to metals are known which are essentially composed of a mixture of a liquid unsaturated monomeric compound, preferably in combination with a polymeric compound and which can be cured with the aid of a catalyst. To improve the properties of such adhesive compositions at least one polymer containing the grouping $(-CH_2-CCl=CH-CH_2-)_n$ or in other words a polychloroprene can be added in quantities less than 30% by weight. In addition, nitriles of unsaturated aliphatic acids, esters of fumaric or maleic acid, as well as unsaturated polyester resins, can be added to improve their properties. Especially high shear strengths can be attained with such adhesives. Especially good strengths are attained when the adhesive mixtures contain as high a content of polymeric material, such as polystyrene or polymethyl methacrylate, as possible. However, high contents of such polymers lead to especially high viscosities in the adhesive compositions which can cause difficulties for some applications. Thinning of these mixtures with monomers, such as methyl methacrylate, in the case of those containing polychloroprene, can easily lead to separation of the mixtures so that products are obtained which cannot be stored and therefore are not suited for practical application or shipping. In addition, a lowering in strength occurs in such products. The quantity of polymeric substances and polychloroprenes which can be present in such mixtures is therefore limited. The inhomogeneities also become evident in the cured adhesive layer. The adhesive mixtures which originally are transparent become more and more cloudy as the curing proceeds. This is especially true when polystyrene is used as the polymeric component. As a result, soft spots can occur in the adhesive layer which only cure or harden completely after long periods of time.

According to the invention it was found that these difficulties could be overcome not only in the production of adhesives but also in the production of putties, troweling masses, coating compositions, filling compositions and casting compositions when compositions are employed which are compounded upon the basis of polymerizable mixtures of (A) monomeric liquid unsaturated organic compounds containing a $>C=CH_2$ group, (B) polymers of such monomer and (C) polymers containing the grouping $(-CH_2-CCl=CH-CH_2-)_n$ which, however, do not contain substances (A) and (B) as simple admixtures but rather as a prepolymer or partial polymerization product which was produced by partial polymerization of substance (A) which was produced in the presence of (C). The compositions according to the invention in addition can contain at least one substance (D) capable of effecting polymerization of the composition only when heated at higher temperatures or at least one component (E), which itself is incapable of effecting polymerization, of a catalyst system effective without heating, preferably of a redox system. The compositions according to the invention may also contain other known additives for increasing the adhesive properties of polymerizable mixtures.

Sulfinic acids or especially azo compounds or α-aminosulfones are examples of substances (D) which only effect polymerization on heating. Specific examples of these types of substances are azoisobutyric acid dinitrile, bis-(tolylsulfonmethyl)amine, bis(tolylsulfonmethyl)methyl amine, bis(tolylsulfonmethyl)ethyl amine and bis(tolylsulfonmethyl)benzyl amine. Also, all known radical forming catalysts, as long as they meet the above requirements, can be employed, preferably, however, peroxides are employed.

In using compositions according to the invention which only contain a substance (D), the curing is effected simply by heating to temperatures above room temperature, preferably about 50 to 95° C.

If, on the other hand, the composition according to the invention is used in its preferred form, namely, wherein it contains a component (E) of a multicomponent catalyst system which is active without heating but which itself does not effect polymerization at room temperatures over long periods of time, it is necessary to supply the missing component or components of the catalysts to the composition shortly before use. Sulfinic acids, for example, can be used as component (E), if desired in combination with peroxides. These are supplemented to a known complete catalyst system by the addition of heavy metal compounds, preferably copper compounds together with compounds containing a labile chlorine atom. It is expedient to employ α-aminosulfones in combination with peroxides as component (E). These are supplemented to form a complete catalyst system in the same manner as the sulfinic acids. Preferebly, however, amines are employed in the compositions according to the invention as component (E) which are then supplemented with peroxides to form redox systems shortly before use of the compositions. Preferably, tertiary amines are employed as the amines, especially those containing an aromatic radical such as is the case in diisopropyl-p-toluidine, dimethyl aniline, dimethyl-p-toluidine and the like. All of the components (E) of the catalyst systems indicated above can be selectively incorporated in the compositions according to the invention originally and the missing components then added shortly before use so that the complete catalyst system is present when it is used. The use of compositions containing the amine component of a redox system, however, is preferred because of their almost unlimited stability on storage. In the other possibilities, the stability on storage in the most unfavorable instances is several days or weeks and usually is several months without occurrence of loss of strengths attainable on lowering of the curing speed.

In addition, it is also possible to add other known accelerators, such as heavy metal compounds, especially copper compounds, organic sulfur compounds, such as α-aminosulfones, α-hydroxysulfones, mercaptans and compounds containing a labile chlorine atom can be added to such compositions if they are not already contained in the system. All of the compositions according to the invention immediately before use contain a complete catalyst or respectively redox system which effects curing in a relatively short period of time, especially when the indicated accelerators are used in addition. Heating of these mixtures as well as the application of higher pressures are possible but not necessary.

The heat supply can also be in the form of a brief temperature rise or a brief application of a high frequency field. In these cases the influence of the heat is not continued until the end hardness is achieved. This measure rather is used to increase the initial strength whereas the hardening is then completed at room temperature.

In both above mentioned instances acyl peroxides can, for example, be employed as the peroxidic compounds. Suitable peroxides, for example, are benzoyl peroxide, lauroyl peroxide, nuclearly chlorinated benzoyl peroxide and the like.

With the aid of the compositions according to the invention, it is possible, in the production of adhesives, putties, cements, troweling masses, coating compositions, filling compositions and casting compositions, to arrive at quick hardening compositions which are composed of only two components and are stable on storage. They do not cloud during curing and in cured state appear transparent and homogeneous and therefore in the cured state represent a homogeneous mixed polymerizate. Separation need not be feared either with high or lower polymer (including (C)) content so that it is simple to provide high or low viscosity products.

Adhesives produced from the compositions according to the invention are well suited for cementing impermeable materials, such as metals, hard synthetic resins, porcelain, wood and the like. They are especially suited for cementing metals together. They are applicable to iron as well as to the light metals. They are also suited for adhesively joining colored metals, such as copper and its alloys, in which case quick curing occurs with low monostyrene contents. No corrosion phenomena occur. The adhesives furthermore exhibit a high resistance against water. In addition, they are superior to previously known adhesives in their stability at lower temperature. The dynamic strengths attained are also substantially higher and failure of the materials joined rather than of the joint occur even with small overlaps.

The production of the prepolymer which expediently should have a syrupy consistence insofar as it is effected in the absence of a polymer (C), is known per se. Expediently this is accomplished by first deaerating the starting mixture essentially consisting of compounds (A) and (C) for a short period at about 40° C. under vacuum and then heating the mixture further to about 75° C. under an inert gas atmosphere. The catalyst is then added, preferably in the form of a solution. Radical forming catalysts, such as peroxides, azo compounds, especially benzoyl peroxide, lauroyl peroxide or azodiisobutyric acid dinitrile, can be employed. The quantity of catalyst added is such that it will be completely consumed when the desired viscosity grade is reached. In order that this can be effected, it is advantageous to maintain the reaction mixture a further time corresponding to the half life periods. Furthermore, it is possible to add regulators, especially sulfur containing organic compounds, such as mercaptans. The addition of such regulators is indispensible in processes carried out in the absence of a polymer (C) but in the process according to the invention which is carried out in the presence of a polymer (C) it is only an optional measure.

During the addition of the catalyst the temperature is raised to about 100° C. while continuously stirring the mixture. After the reaction is completed the mixture is cooled quickly and, if desired, a known stabilizer added thereto. The resulting syrupy prepolymer is practically of unlimited stability on storage, especially when no polymerization initiator, such as compounds containing a labile chlorine atom, is present. Such practically unlimited stability can easily be achieved by the use of pure starting materials. If the prepolymer has been produced in the absence of a regulator which at the same time is an accelerator, the prepolymers obtained are especially insensitive and are distinguished by their especially high stability upon storage. It is expedient to add the catalyst stepwise during the production of the prepolymer as in this way it is more easily possible to adjust the quantity to the purpose at hand. Preferably, the prepolymers employed in the compositions according to the invention have a viscosity of 500 cp. to 500,000 cp. at 20° C.

The use of the above described prepolymer as components of the compositions according to the invention provides a substantial technical advantage, as previously, in the production of adhesives, putties, cements, troweling masses and the like, it always was necessary first to prepare and isolate a polymer such as polymethyl methacrylate or polystyrene. In the compounding of the actual adhesive or other composition it was necessary to again dissolve such polymer to provide a solution thereof using monomeric components such as methyl methacrylate or styrene or the like as the solvents. A high polymer content in such solutions always led to high viscosities. According to the invention these disadvantages are avoided by employing a prepolymer syrup in which the polymer is dissolved in the monomer from which it was produced which per se does not yet have any adhesive, putty or the like properties, and which contrary to the known procedures for the preparation of such prepolymers was produced in the presence of a polymer containing the grouping $(-CH_2-CCl=CH-CH_2-)_n$ to provide such properties. The prepolymer employed according to the invention is a homogeneous syrup of polymeric substances dissolved in monomeric substances in which the proportion of polymer constituent derived from the monomers (that is, disregarding polymer (C)) is between 10 and 60%, preferably about 30%. These proportions provide the range of viscosities mentioned above. The proportion of the polymeric substances in the prepolymer depends upon the intended use of the compositions. The unsaturated monomer constituent functions both as solvent and as a curable component of the compositions.

Monomeric liquid unsaturated compounds (A), such as esters of acrylic and/or methacrylic acid or other polymerizable compounds containing a $>C=CH_2$ group, preferably styrene, can be employed singly or in combination as starting materials for the production of the prepolymers, of course in addition to polymer (C) in the presence of which the prepolymerization is conducted. Methyl methacrylate, methacrylic acid butyl ester, acrylic acid ethyl ester, glycol dimethacrylate, vinyl toluene, vinyl acetate, acrylonitrile, acrylic acid, decyl-octyl methacrylate and the like are, for example, suited as starting monomers. Methyl methacrylate, especially in combination with styrene, is preferably employed.

As already mentioned above, the compositions according to the invention can contain further additions (F) which are capable of improving their adhesive properties in a known manner. These substances can be incorporated in the mixtures even before preparation of the prepolymers. However, they may also be mixed in after the prepolymerization has taken place or they can be added both before and after prepolymerization.

Esters of unsaturated carboxylic acids, especially of fumaric or maleic acid, for example, are compounds which can be used for additions (F). Preferably, fumaric acid dimethyl ester is employed as such an addition. Such esters can be added in quantities up to 5% by weight of the total mixture. Furthermore, it can be of advantage to add nitriles of unsaturated aliphatic acids, preferably, acrylic or methacrylic acid nitrile, in quantities up to 10% by weight of the total mixture. Also, it is often expedient to add an unsaturated polyester resin in quantities up to 10% by weight of the total mixture as an additional component. The term "unsaturated polyester resins" is employed herein to signify resin esters derived from polycarboxylic acids and polyhydric alcohols, preferably dicarboxylic acids and dihydric alcohols, at least one of the acid and alcohol components being unsaturated. Examples of such unsaturated polyesters are those derived from maleic or fumaric acid and a glycol, such as ethylene glycol or propylene glycol. Also, additions of up to 5% by weight of the total mixture of unsaturated carboxylic acids, preferably acrylic acid, can advantageously improve the properties of the compositions. Finally, it is also possible to add further quantities of monomeric acrylic or methacrylic acid esters, preferably methyl methacrylate or polymers of such esters, in quantities up to 40% of the total mixture. The compositions can also, as is known, in similar compositions, contain small quantities of paraffin and/or stabilizers, as well as cross-linking agents. Fillers and pigments can also be present.

The polymers (C) employed according to the invention which contain the grouping $$(-CH_2-CCl=CH-CH_2-)_n$$

are available commercially under the trademarks Neoprene and Perbunan C. Those types which have not been modified with sulfur have proved particularly suited. In general, they are employed in quantities of at least 1% by weight of the total mixture. The upper limit of such addition is about 20% by weight. Preferably, quantities between 2 and 5% by weight are employed.

Especially good results can be obtained in the cementing of objects, particularly metal objects, with adhesives produced with the compositions according to the invention.

In the instance where the composition according to the invention is employed in the form where it only contains a substance (D), at least one of the surfaces to be joined is coated with the composition, the other surface placed in contact therewith and curing the composition by heating, if desired, with the application of light pressure.

If, on the other hand, the composition is employed in the form where it contains a substance (E), at least one further substance is incorporated in such composition which together with substance (E) forms a catalyst system in the sense indicated above. If desired, other known accelerators may also be added. The mixture thus produced is employed to coat at least one of the surfaces to be joined, the other surface placed in contact therewith and the composition permitted to cure at room temperature or, if desired, with moderate application of heat and/or, if desired, with light application of pressure. Preferably, the adhesive composition employed initially contains an amine or peroxide and before use a peroxide or amine respectively added thereto to complete the catalyst system. It is also possible to incorporate a combination of an aminosulfone and a peroxide initially in the composition and before use add a heavy metal compound in combination with a compound containing a labile chlorine atom or vice versa. Various other combinations such as previously indicated may also be employed.

Adhesives prepared from the compositions according to the invention have proved particularly suited for adhesively joining surfaces of metals with the assistance of fibers, mats, woven fabrics and the like, by the procedure disclosed in my earlier copending application S.N. 115,088, filed June 6, 1961. In such procedure a peroxide containing adhesive composition is employed which, if desired, can contain other components of an accelerator system, especially copper compounds and/or organic sulfur compounds. The fibers, mats or woven fabrics employed are pretreated either with a compound containing a labile chlorine atom or an N-dialkylol amine containing at least one aromatic radical or an aromatic tertiary amine, the boiling point of which is higher than +230° C. Such fibrous materials can also be pretreated if desired additionally with other components of an accelerator system, especially copper compounds and/or organic sulfur compounds. The pretreated fibrous materials are capable of storage and therefore need not be used immediately.

In carrying out this modification of the process according to the invention all natural and synthetic fibers, such as glass fibers, polyamide (nylon) fibers, polyester fibers and the like, are suitable. The fibers can be used as such or in the form of mats and especially as woven fabrics. Preferably, woven glass fiber fabrics are employed. Also, asbestos or sisal fibers can be used with advantage. Expediently, the fiber materials are impregnated with the adhesive before use. According to the preferred embodiment of the process according to the invention the surfaces of the parts to be joined are first coated with a layer of the adhesive and then fibers, woven fabrics or mats which have been impregnated with the same adhesive are placed between such coated surfaces. When especially good fitting surfaces are to be joined it suffices when only the impregnated woven fabric is placed between the parts to be joined.

Examples of compounds containing a labile chlorine atom in their molecules, for instance, are hydrochloric acid and its salts, especially with organic bases, preferably tertiary amines, as well as quaternary chlorides of betaine or hydroxyl amine derivatives according to Belgian Patent 545,139 and French Patent 1,141,742. They are applied to the fibers, woven fabrics and the like in quantities of 0.05 to 2.0% by weight.

Examples of N-dialkylol amines containing at least one aromatic radical, for instance, are diethylol-p-toluidine, diisopropylol-p-toluidine, diisopropylol-m-toluidine and di-n-butylol-p-toluidine.

Examples of tertiary aromatic amines whose boiling point is above +240° C., for instance, are tetramethyldiaminodiphenylmethane, diacetic acid ester of diethylol-p-toluidine and N-tertiary-butylol-N-methyl aniline and diethyl-p-toluidine. Naturally both types of amines mentioned above can be used simultantously. The amines used should be non-sensitive to oxidation by air. Preferably the amines are used in conjunction with acyl peroxides.

In addition to the amines and the compounds containing a labile chlorine atom, other components of known accelerator systems, especially copper compounds, may also be applied to the fibers. Among such additional components, organic sulfur compounds, such as α-aminosulfones, α-hydroxysulfones and mercaptans may also be mentioned. Of these, the α-aminosulfones containing at least one aromatic radical and the mercaptans are preferred. These additional components of accelerator systems can also be added to the adhesive mixture as an additional component.

The following are illustrative of preferred sulfones:

$(CH_3C_6H_4SO_2CH_2)_2NH$ $(CH_3C_6H_4SO_2CH_2)_2N-CH_3$ $(CH_3C_6H_4SO_2CH_2)_2N-C_2H_5$

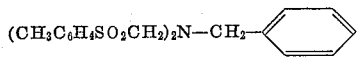

The application of components of the accelerator systems to the fibers can be achieved in a number of different ways. For example, the fibers may be dipped in or sprayed with solutions thereof, preferably followed by drying. As solvents, all substances which are volatile and dissolve the accelerator components can be used, such as, for example, methyl methacrylate, methyl acetate, acetone, methanol and water. It is, of course, understood that in applying the accelerator to the fiber care should be taken that as little as possible of the finish of the fibers, such as, for example, with sizing, binders and the like, is removed. This can usually be achieved by appropriate selection of the solvent. For example, mats which are impregnated with the aid of water or methanol feel soft and loose, whereas when methyl methacrylate or methyl acetate are used a slight hardening can be ascertained.

Subsequent to the treatment the accelerator substances lie in very finely divided state on the surfaces of the fibers, fabrics, mats and the like. The fibers thus treated are very durable and can be stored almost any desired length of time.

In carrying out the process according to the invention the adhesive mixture which contains the peroxide in as uniform a distribution as possible is contacted with the fibers, woven fabrics, mats and the like which carry the amines or the compounds containing a labile chlorine atom on their surfaces in a fine distribution, so that a rapid and uniform curing of the adhesive can be accomplished. Such curing can be carried out at room temperature as well as at elevated temperatures. As the adhesive mixture, as long as it has not been contacted with the fibers, woven fabrics, mats and the like, only contains the peroxidic compound, a long pot life is provided so that, in practical application, larger batches can be prepared and held available for periods of several weeks without such mixtures deteriorating to such an extent that the bonds obtained therewith suffer a loss in strength.

A further advantage of the process according to the invention is that the adhesive bonding can be effected with a simple two component system. The process according to the invention renders it possible to produce completely satisfactory adhesive bonds between large surface areas which must meet high requirements even with high tolerances. The strength of bond attained between large parts is not below that obtained in bonds between relatively small parts.

A further advantage of the process according to the invention is that the shearing strength attainable with large overlaps is almost as high as with small overlaps. This provides a further simplification of the adhesive bonding process, as less consideration need be given to this point.

In addition, particularly, the shock and impact resistances of the bonded parts are improved by the process according to the invention.

In general, the strength under continued load and the dynamic strength of adhesive bonds between metals are considerably below the tearing strength in a limit shear strength test. This difference is less when the process according to the invention is employed.

In bonding small parts it is expedient to use thin woven fabrics and in bonding thick and larger surfaced parts with corresponding tolerancy to use coarser and/or thicker woven fabrics. The number of meshes and mesh width should be so selected with respect to each other that at the greatest strength the meshes are so well penetrated that a rapid and faultless wetting occurs. It is also of advantage if the metal surfaces to be joined are pretreated by the customary procedures, such as degreasing and especially cleaning by sand blasting, roughening with emery or steel brush or chemical pretreatment such as with an etching agent.

A further advantageous modification of the process for adhesively joining surfaces of objects and especially of metal objects using an adhesive composition according to the invention resides in applying a coating of a composition according to the invention containing a substance (E) to one of the surfaces to be joined and applying a coating to the other surface to be joined of a composition according to the invention containing at least one substance which together with substance (E) of the first coating forms an active catalyst system. Both coated surfaces are then contacted and the adhesive joint permitted to cure, if desired, with the application of light pressure and/or moderate heating. According to this modification each of the two surfaces to be joined is coated with a composition stable on storage. When both surfaces are brought together a reactive mixture is provided. While preferably amines and peroxides are employed also in this modification to provide the reactive catalyst system, others of the previously mentioned combinations can also be employed.

The polymerization initiates spontaneously and continues until complete curing is effected. Heating of the parts to be joined is possible but not necessary and preferably is not used in this procedure. Also, no particular application of pressure is necessary. It is to be understood, of course, that further known accelerators, as well as substances improving the adhesive properties, can be added to one or both coatings. The quantity of catalyst component in each coating composition is preferably double that usual in similar polymerization mixtures. As a consequence, when both coatings are brought together, the quantity of amine and peroxide with reference to the total quantity of adhesive in both coatings is proper. This procedure provides for advantageously long "open times." That is, the time the surfaces to which the adhesive composition has been applied may be left open before the actual positioning in joining relationship takes place. This is of considerable importance when large surfaces are to be joined and in continuous processes.

It was furthermore found that it is expedient in carrying out such process to add small quantities of paraffin or wax like substances, such as montan wax, bees wax, ceresin, spermaceti and the like to the adhesive compositions. This lengthens the open time possible still further as the paraffin or wax forms a surface skin on the polymerization mixture and hinders evaporation of components thereof. Surprisingly, such protective skin does not decrease the strengths of the bond attained.

The compositions according to the invention can contain the catalyst components (E) or the substances (D) in quantities normally used for processing similar polymerization mixtures. For example, the peroxidic compounds can be used in quantities between 0.3 and 6% and the amines in quantities of 0.04 to 3% by weight, based on the weight of the whole mixture.

In the following illustrative examples the proportions are given in percent by weight unless otherwise indicated. The unsaturated polyester resins employed in the examples are of the type commonly available commercially, for example, Palatal, P & 7, a product of BASF and Paraplex P 444, a product of Rohm Haas, Philadelphia. The polychloroprenes are also a type commonly commercially available, for example, Neoprenes W, WRT, WRV, products of E. I. du Pont de Nemours, and Perbunan C 320, of Farbenfabriken Bayer, are suitable types.

EXAMPLE 1

*Preparation of prepolymer*

A 2 kg. batch consisting of

| | Percent |
|---|---|
| Methyl methacrylate | 80.0 |
| Monostyrene | 10.0 |
| Polychloroprene (sulfur free) | 4.0 | was placed in a 3 necked flask and was deaerated at 40° C. while stirring for 10 minutes at a pressure of 200 mm. Hg. The deaerated batch was then heated under nitrogen to 75° C. and 0.025% of azodiisobutyric acid dinitrile dissolved in methyl methacrylate added thereto. The temperature rose in view of the exothermic reaction taking place and was held at 100° C. for 65 minutes. Thereafter the reaction mixture was cooled and 0.015% of hydroquinone added as stabilizer. The prepolymer syrup obtained had a viscosity of 51,000 cp. at 21° C.

EXAMPLE 2

A prepolymer was prepared from a mixture consisting of

| | Percent |
|---|---|
| Methyl methacrylate | 51.0 |
| Monostyrene | 35.0 |
| Butyl methacrylate | 10.0 |
| Acrylic acid | 1.0 |
| Polychloroprene (sulfur free) | 3.0 | in the presence of 0.05% azodiisobutyric acid dinitrile and 0.35% of glycol dimercapto acetate. The catalyst was added over a period of 85 minutes and the resulting mixture then stirred for a further 2 hours. After cooling, 0.015% of hydroquinone were added as a stabilizer. This prepolymer had a viscosity of 266,000 cp.

Then the following additional components were admixed with the prepolymer

| | Percent |
|---|---|
| Methyl methacrylate | 4.0 |
| Diisopropylol-p-toluidine | 0.5 |
| Finely divided silica produced by decomposition of a volatile silicon compound in the vapor phase (Aerosil) | 0.7 |
| Paraffin | 0.2 |

This mixture after addition of 3% of a hardening paste of 50% benzoyl peroxide in dibutyl phthalate was employed for adhesively uniting AlMgCu alloy strips 100 x 20 x 2 mm. with a single 10 mm. overlap. After 24 hours' curing time at room temperature the shear strength of the bond was 460 kg. measured at 20° C.

EXAMPLE 3

A prepolymer was prepared analogously to Example 2 from

| | Percent |
|---|---|
| Methyl methacrylate | 63 |
| Monostyrene | 34 |
| Polychloroprene (sulfur free) | 3 | in the presence of 0.035% of azodiisobutyric acid dinitrile and 0.35% of glycol dimercapto acetate, the catalyst being dropped in over a period of 2 hours and the subsequent stirring time being 90 minutes. The viscosity of the prepolymer was 12,450 cp.

The following additional components were admixed with the prepolymer

| | Percent |
|---|---|
| An unsaturated polyester resin (R) (a resin obtained from about equal parts maleic-fumaric acid and 1,2-propylene glycol as a 60% solution in monostyrene) | 2.0 |
| Polyester resin (P) (75% solution of an unsaturated polyester in methyl methacrylate, viscosity 3000–4000 cp, acid number 38) | 1.0 |
| Diisopropylol-p-toluidine | 0.5 |
| Paraffin | 0.2 |
| Hydroquinone | 0.02 |

This mixture after addition of 3% of a hardening paste as in Example 2 was used to bond light metal (AlMgCu), steel and copper strips as in Example 2. The shearing strengths for the bonds obtained were 670 kg. for the light metal strips, 705 kg. for the steel strips and 510 kg. for the copper strips.

EXAMPLE 4

The prepolymer was prepared as in Example 3 except that 62.0% of methyl methacrylate and 4% of polychloroprene were employed and the subsequent stirring period being only 70 minutes. The viscosity was 36,400 cp. The following additional components were admixed with the prepolymer

| | Percent |
|---|---|
| Methyl methacrylate | 10.0 |
| Unsaturated polyester resin (R) | 2.0 |
| Polyester resin (P) | 1.0 |
| Diisopropylol-p-toluidine | 0.5 |
| Paraffin | 0.2 |

This mixture after addition of 3% of a hardening paste as in Example 2 was used to bond light metal, steel and copper strips as in Example 2. The shear strength for the bond obtained with the light metal strips was 685 kg. measured at 20° C. and 665 kg. at −20° C. At −20° C. shear strength of the bond obtained with the steel strips was 735 kg. and with the copper strips 515 kg.

EXAMPLE 5

A prepolymer was prepared using a mixture of

| | Percent |
|---|---|
| Methyl methacrylate | 60.0 |
| Monostyrene | 31.0 |
| Polychloroprene (sulfur free) | 4.0 |
| Acrylonitrile | 4.0 | in the presence of the catalyst and regulator described in Example 3. The catalyst was dropped in over a period of 2 hours and the subsequent stirring period was 45 minutes. A prepolymer with a viscosity of 18,700 cp. was obtained. The following additional components were admixed therewith

| | Percent |
|---|---|
| Unsaturated polyester resin (R) | 2.0 |
| Polyester resin (P) | 1.0 |
| Diisopropylol-p-toluidine | 0.5 |
| Hydroquinone | 0.02 |
| Paraffin | 0.2 |

This mixture after addition of 3% of a hardening paste as in Example 2 was used to bond light metal strips as in Example 2. The shear strength attained in the bond after 1 day's storage at room temperature was 640 kg. measured at 20° C.

EXAMPLE 6

A prepolymer was prepared using a mixture of

| | Percent |
|---|---|
| Methyl methacrylate | 71 |
| Monostyrene | 25 |
| Polychloroprene (sulfur free) | 4 | in the presence of 0.035% or azodiisobutyric acid dinitrile. The catalyst was dropped in during 45 minutes and the subsequent stirring period was 35 minutes. A prepolymer with a viscosity of 89,400 cp. was obtained.

The same additional components as in Example 5 were added.

The resulting mixture after addition of 3% of a hardening paste as in Example 2 was used to bond light metal strips as in Example 2. After 1 day's storage at room temperature the shear strength of the bond was 600 kg. at +20° C. This strength could be increased to 655 kg. by an additional tempering treatment of 1 hour at 100° C. At a testing temperature of −40° C. a shear strength of 665 kg. was ascertained.

EXAMPLE 7

A prepolymer was produced using the following starting mixture

| | Percent |
|---|---|
| Methyl methacrylate | 81.0 |
| Monostyrene | 15.0 |
| Polychloroprene (sulfur free) | 4.0 |

0.035% of azodiisobutyric acid dinitrile was used as the catalyst. The catalyst was dropped in during 18 minutes and the subsequent stirring period was 42 minutes. A prepolymer with a viscosity of 62,600 cp. was obtained. The following additional components were added

| | Percent |
|---|---|
| Methyl methacrylate | 15.0 |
| Unsaturated polyester resin (R) | 2.0 |
| Polyester resin (P) | 1.0 |
| Diisopropylol-p-toluidine | 0.5 |
| Hydroquinone | 0.02 |
| Paraffin | 0.2 |

The resulting mixture after addition of 3% of a hardening paste as in Example 2 was used to bond light metal (AlMgCu) strips and copper strips as in Example 2. After 24 hours' storage at room temperature the shear strength of the bond between the light metal strips was 680 kg. and between the copper strips was 595 kg. When the bond was additionally tempered 1 hour at 100° C., the shear strength of the bond between the light metal strips was 715 kg. At a testing temperature of +60° C. the light metal strips after 24 hours' storage at room temperature had a shear strength of 505 kg. and at a testing temperature of −40° C. it was 550 kg.

EXAMPLE 8

A prepolymer was produced using the following starting mixture

| | Percent |
|---|---|
| Methyl methacrylate | 96 |
| Polychloroprene (sulfur free) | 4 | in the presence of 0.035% of azodiisobutyric acid dinitrile as the catalyst. The catalyst was dropped in in one minute and the subsequent stirring period was 22 minutes. A prepolymer of a viscosity of 112,350 cp. was produced.

The following additional components were added

| | Percent |
|---|---|
| Methyl methacrylate | 20.0 |
| Unsaturated polyester resin (R) | 2.0 |
| Polyester resin (P) | 1.0 |
| Diisopropylol-p-toluidine | 0.5 |
| Hydroquinone | 0.02 |
| Paraffin | 0.2 |

The resulting mixture after addition of 3% of a hardening paste according to Example 2 was used to bond light metal strips as in Example 2. After one day's storage at room temperature the shear strength measured at 20° C. was 715 kg. and after an additional 60 minutes' tempering at 100° C. it was 680 kg. After one day's storage at room temperature the shear strength was 590 kg. measured at +60° C. and 515 kg. measured at −40° C.

EXAMPLE 9

A prepolymer was produced using the following starting mixture

| | Percent |
|---|---|
| Methyl methacrylate | 80.0 |
| Monostyrene | 15.0 |
| Polychloroprene (sulfur free) | 4.0 |
| Polyester resin (P) | 1.0 | in the presence of 0.035% azodiisobutyric acid dinitrile as catalysts. The catalyst was dropped in in 1 minute and the subsequent stirring period was 45 minutes. A prepolymer of a viscosity of 27,050 cp. was obtained.

The following additional components were added

| | Percent |
|---|---|
| Unsaturated polyester resin (R) | 2.0 |
| Diisopropylol-p-toluidine | 0.5 |
| Paraffin | 0.2 |
| Hydroquinone | 0.02 |

This mixture was used as in Example 2 to bond light metal (AlMgCu) strips. After one day's storage at room temperature the shear strength of the bond was 775 kg. measured at 20° C. and after an additional tempering at 100° C. for 6 hours it was 745 kg. At a measuring temperature of −40° C. the shear strength was 785 kg.

EXAMPLE 10

A prepolymer was prepared using the following starting mixture

| | Percent |
|---|---|
| Methyl methacrylate | 86 |
| Monostyrene | 10 |
| Polychloroprene (sulfur free) | 4 | in the presence of 0.020% azodiisobutyric acid dinitrile as catalyst. The catalyst was dropped in in 1 minute and the subsequent stirring period was 42 minutes. A prepolymer of a viscosity of 3,450 cp. was obtained.

The following additional components were added

| | Percent |
|---|---|
| Polyester resin (P) | 3.0 |
| Diisopropylol-p-toluidine | 0.5 |
| Paraffin | 0.2 |
| Hydroquinone | 0.02 |

The mixture was used as in Example 2 to bond light metal (AlMgCu) strips. After one day's storage at room temperature the shear strength of the bond measured at 20° C. was 760 kg. and after additional tempering for 4 hours at 100° C. it was 885 kg. After one day's storage the shear strength measured at −40° C. was 695 kg.

EXAMPLE 11

A prepolymer was prepared using the following starting mixture

| | Percent |
|---|---|
| Methyl methacrylate | 86 |
| Monostyrene | 10 |
| Polychloroprene (sulfur free) | 4 | in the presence of 0.025% of azodiisobutyric acid dinitrile as the catalyst. The catalyst was dropped in in 1 minute and the subsequent stirring period was 65 minutes. A prepolymer of a viscosity of 51,000 cp. was obtained.

The following additional components were added

| | Percent |
|---|---|
| Methyl methacrylate | 10.0 |
| Polyester resin (P) | 3.0 |
| Paraffin | 0.2 |
| Hydroquinone | 0.02 |

No amine was added and the curing was effected with the exclusive use of 3% of a benzoyl peroxide hardening paste as in Example 2 at +80° C. After a curing period of 90 minutes at this temperature the shear strength of the bond obtained with light metal strips as in Example 2 was 395 kg. measured at room temperature and after a curing period of 120 minutes it was 765 kg. The adhesive after mixture with the benzoyl peroxide in a batch of 100 g. had a pot time of at least 3 weeks at room temperature.

EXAMPLE 12

An adhesive mixture was prepared of

| | Percent |
|---|---|
| Prepolymer of Example 1 | 86.8 |
| Methyl methacrylate | 10.0 |
| Polyester resin (P) | 3.0 |
| Paraffin | 0.2 |
| Hydroquinone | 0.005 | and 3% of a hardening paste as in Example 2 added thereto. This mixture was used to bond iron parts of structural steel St 37.12 with a single overlap. The bonding surface area was 51 x 34 mm., the length of the overlap being 51 mm. and its width 34 mm. A woven glass fiber mat, Gevetex 216 (an alkali free glass fiber mat with a silane finish), was used in the production of the adhesive bond. Such mat had been pretreated with 120 cc. of a solution of 1.6 g. of tetramethyl diamino diphenyl methane in methyl methacrylate per 100 g. of the weight of the mat. The mat was impregnated with the adhesive mixture and placed between the surfaces to be bonded. The mat was used after 100 days' storage at room temperature after the pretreatment. After 3 days' storage at room temperature the shear strength of the bond attained was 6,250 kg.

EXAMPLE 13

Example 12 was repeated except that the glass fiber mat used therein was replaced by a glass fiber mat Fategon 600 (a glass fiber mat with about a 10% alkali content) which had been pretreated with diisopropylol-p-toluidine. After 3 days' storage at room temperature the shear strength of the bond was 7,450 kg.

EXAMPLE 14

A prepolymer was prepared from

| | Percent |
|---|---|
| Methyl methacrylate | 86.0 |
| Vinyl toluene | 10.0 |
| Polychloroprene (sulfur free) | 4.0 | in the presence of 0.025% of azodiisobutyric acid dinitrile as catalyst. The catalyst was added in 1 minute and the mixture was stirred for a further 42 minutes. The viscosity of the prepolymer was 9,300 cp. The following additional components were admixed therewith

| | Percent |
|---|---|
| Unsaturated polyester resin (R) | 2.0 |
| Polyester resin (P) | 1.0 |
| Diisopropylol-p-toluidine | 0.5 |
| Paraffin | 0.2 |

This mixture after addition of 3% of a hardening paste as in Example 2 was used to bond light metal (AlMgCu) and steel strips with a single 10 mm. overlap as in Example 2. The shearing strength of the bonds at 20° C. after one day's storage at room temperature was 685 kg. for the light metal strips and 750 kg. for the steel strips.

EXAMPLE 15

A prepolymer of a viscosity of 62,600 cp. was prepared from a mixture consisting of

| | Percent |
|---|---|
| Methyl methacrylate | 81 |
| Monostyrene | 15 |
| Polychloroprene (sulfur free) | 4 | as in Example 7.

The following additional components were admixed therewith

| | Percent |
|---|---|
| Methyl methacrylate | 15.0 |
| Polyester resin (R) | 2.0 |
| Polyester resin (P) | 1.0 |
| Hydroquinone | 0.02 |
| Paraffin | 0.2 |
| β-Phenyl ethyl dibutyl amine hydrochloride | 0.10 |
| P.p.m. Cu++ as naphthenate | 2.0 |
| Bis(tolylsulfonmethyl)amine paste (50% in dibutyl phthalate) | 0.8 |
| 4,4'-p-chlorobenzoyl peroxide paste (50% in dibutyl phthalate) | 2.0 |

This mixture was used directly to bond light metal strips (AlMgCu) as in Example 2 with a 10 mm. overlap. The shear strength of the bond after 24 hours' storage at room temperature measured at 20° C. was 645 kg.

EXAMPLE 16

A prepolymer was prepared from the following mixture

| | Percent |
|---|---|
| Methyl methacrylate | 87 |
| Monostyrene | 10 |
| Polychloroprene (sulfur free) | 3 | in the presence of 0.035% of azodiisobutyric acid dinitrile as a catalyst, the catalyst being added during 1 minute and the mixture being stirred for a further 45 minutes. The viscosity thereof was 52,100 cp.

The following components were then admixed therewith

| | Percent |
|---|---|
| Methyl methacrylate | 5.0 |
| Polyester resin (R) | 2.0 |
| Polyester resin (P) | 1.0 |
| Diisopropylol-p-toluidine | 0.5 |
| Paraffin | 0.3 |

After addition of 3% of a hardening paste as in Example 2 the composition was used to bond light metal strips as in Example 2. The shear strength of the bond after 24 hours at room temperature was 620 kg. measured at 20° C.

EXAMPLE 17

A prepolymer was prepared from

| | Percent |
|---|---|
| Methyl methacrylate | 86 |
| Monostyrene | 10 |
| Polychloroprene (sulfur free) | 4 | in the presence of 0.035% of azodiisobutyric acid dinitrile as a catalyst, the catalyst being added during 1 minute and the mixture being stirred a further 45 minutes. The viscosity thereof was 40,300 cp. The same additional components as in Example 16 were added and light metal strips were bonded as in Example 16. After 24 hours at room temperature the shear strength of the bond was 600 kg. measured at 20° C.

EXAMPLE 18

A prepolymer was prepared from

| | Percent |
|---|---|
| Methyl methacrylate | 87 |
| Monostyrene | 10 |
| Polychloroprene (sulfur free) | 3 | in the presence of 0.30% of azodiisobutyric acid dinitrile as catalyst, the catalyst being added during 1 minute and the mixture being stirred for a further 45 minutes. The viscosity thereof was 62,400 cp. The same additional components as in Example 16 were added and light metal strips were bonded as in Example 16. After 24 hours at room temperature the shear strength of the bond was 625 kg. measured at 20° C.

EXAMPLE 19

A prepolymer was prepared from

| | Percent |
|---|---|
| Methyl methacrylate | 86 |
| Monostyrene | 10 |
| Polychloroprene (sulfur free) | 4 | in the presence of 0.025% of diisobutyric acid dinitrile as catalyst, such catalyst being added during 1 minute and the mixture being stirred a further 65 minutes. The viscosity thereof was 51,300 cp. The following additional components were added thereto

| | Percent |
|---|---|
| Methyl methacrylate | 5.0 |
| Polyester resin (R) | 2.0 |
| Polyester resin (P) | 1.0 |
| Paraffin | 0.3 |

The resulting mixture was divided into two parts, of which one was mixed with 1.0% of diisopropylol-p-toluidine and the other with 6.0% of the benzoyl peroxide paste of Example 2. Each of the resulting compositions was then employed to coat two opposed surfaces to be bonded. The shear strength of the bond obtained after 24 hours at room temperature on light metal strips as in Example 2 with a 10 mm. overlap was 660 kg. measured at 20° C.

EXAMPLE 20

A composition was prepared as in Example 19 except that it was not divided into two parts and 0.5% of azodiisobutyric acid dinitrile was added as a catalyst instead of the peroxide and amine and used to bond metal strips. The bond was cured for 3 hours at +80° C. and after a further 3 hours' storage at room temperature the shear strength thereof was 450 kg. measured at 20° C.

EXAMPLE 21

A composition was prepared as in Example 20 except that the azodiisobutyric acid dinitrile was replaced by a 50% paste of bis(tolylsulfonmethyl)amine in dibutyl phthalate and similarly used to bond metal strips. The bond was cured for 135 minutes at +80° C. and after a further 15 days' storage at room temperature the shear strength of the bond was 570 kg. measured at +20° C.

I claim:
1. A process for adhesively joining the surfaces of impervious materials which comprises applying a curable fluid composition comprising a polymerizable mixture of a liquid polymerizable monomer containing a single >C=CH₂ group capable of radical polymerization, a polymer of such monomer, and polychloroprene, such polymerizable mixture being in the form of a partial polymerization product formed by partial polymerization of the liquid polymerizable monomer containing a single >C=CH₂ group in the presence of such polychloroprene, such polymerizable mixture containing 10% to 60% by weight of the polymer of said monomer formed in said partial polymerization dissolved in said monomer, between the surfaces to be joined and effecting bulk polymerization of such composition in the presence of a radical forming polymerization catalyst in contact with the surfaces to be joined.
2. The process of claim 1 in which said monomer is a liquid acrylic monomer.
3. The process of claim 1 in which said monomer is methyl methacrylate.
4. The process of claim 1 in which the curable fluid composition in addition comprises an ester of an unsaturated carboxylic acid in a quantity up to 5% by weight of the composition.
5. The process of claim 1 in which the curable fluid composition in addition comprises an unsaturated polyester resin in a quantity up to 10% by weight of the composition.
6. The process of claim 1 in which the curable fluid composition in addition comprises a nitrile of an unsaturated aliphatic acid in a quantity up to 5% by weight of the composition.
7. The process of claim 1 in which the curable fluid composition in addition comprises a nitrile of an unsaturated aliphatic acid in a quantity up to 10% by weight of the composition.
8. The process of claim 1 in which the quantity of polychloroprene is 1-20% by weight of the composition.
9. The process of claim 1 in which the curable fluid composition comprises a partial polymerization product containing monomeric methyl methacrylate and styrene, polymers of such monomers and polychloroprene formed by partial polymerization of a mixture of methyl methacrylate and styrene in the presence of such polychloroprene, such partial polymerization product containing 10% to 60% by weight of the polymer of said monomer formed in said partial polymerization.
10. The process of claim 1 in which said polymerization catalyst is a redox system composed of a tertiary amine and a peroxide.

References Cited
UNITED STATES PATENTS

| | | | |
|---|---|---|---|
| 2,407,143 | 9/1946 | Dauer et al. | 260—879 |
| 2,981,650 | 4/1961 | Bader et al. | 260—879 |
| 2,991,258 | 7/1961 | Nobbs et el. | 260—879 |
| 3,027,948 | 6/1962 | Lander et al. | 360—879 |
| 3,047,534 | 7/1962 | Dyer et al. | 260—879 |

MURRAY TILLMAN, *Primary Examiner.*

J. T. GOOLKASIAN, *Assistant Examiner.*